United States Patent [19]

Eystratov et al.

[11] Patent Number: 4,494,448
[45] Date of Patent: Jan. 22, 1985

[54] COMPOSITE PISTON OF POSITIVE DISPLACEMENT HYDRAULIC MACHINE AND METHOD FOR MANUFACTURING SAME

[75] Inventors: Vitaly A. Eystratov; Mikhail Y. Elkin; Viktor Y. Danilenko; Ivan M. Stepunin; Nikolai E. Tsenta; Sergei A. Rud; Leonid M. Belferman, all of Kharkov, U.S.S.R.

[73] Assignee: Vsesojuzny Nauchno-Issledovatelsky I Proektno-Konstruktorsky Institut Promyshelennykh Gidroprivodov I Girodoavtomatiki, Kharkov, U.S.S.R.

[21] Appl. No.: 351,346

[22] Filed: Feb. 23, 1982

[51] Int. Cl.³ .......................... F16J 1/00; B23P 15/10
[52] U.S. Cl. ............................ 92/172; 29/156.5 R; 29/510; 29/517; 72/258
[58] Field of Search ................. 92/172; 29/156.5 A, 29/156.5 R, 510, 511, 517, 520; 72/343, 258

[56] References Cited

U.S. PATENT DOCUMENTS

| 2,945,293 | 7/1960 | Last | 29/511 |
|---|---|---|---|
| 3,577,850 | 5/1971 | Harris | 29/510 |
| 3,605,475 | 6/1969 | Eakin et al. | 29/159.2 |
| 3,633,467 | 1/1972 | Watanabe et al. | 92/172 |
| 3,813,909 | 6/1974 | Roger | 29/159.2 |
| 3,915,074 | 10/1975 | Bristow et al. | 92/172 |
| 3,984,904 | 10/1976 | Schlecht | 29/156.5 R |

Primary Examiner—Robert E. Garrett
Assistant Examiner—Scott L. Moritz
Attorney, Agent, or Firm—Robert E. Burns; Emmanuel J. Lobato; Bruce L. Adams

[57] ABSTRACT

A core blank made of a material lighter than that of the piston is placed into a blind hollow of a barrel-shaped piston blank. The composite blank of the piston, thus formed, is subjected to a direct cold straight-through extrusion through a die. A piston is produced wherein the entire surface of the core is congruent with the internal surface of the piston and is in a clearanceless preloaded contact therewith.

6 Claims, 4 Drawing Figures

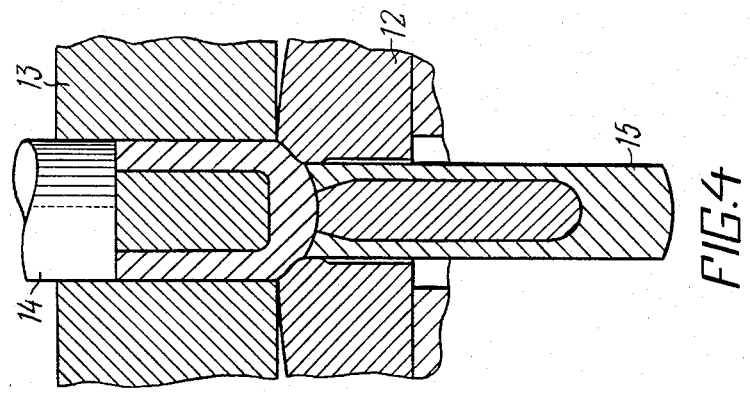
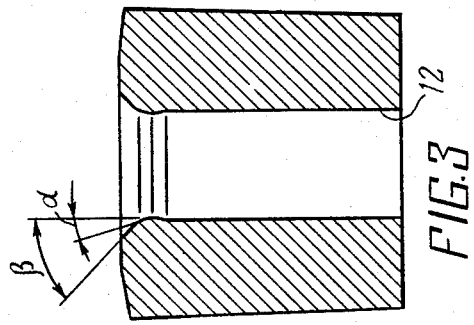
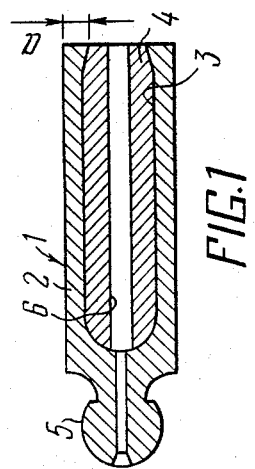
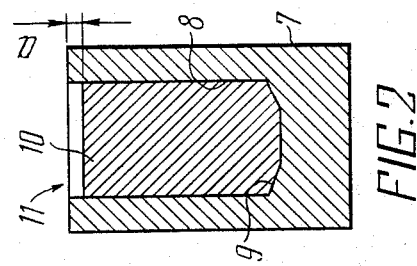

COMPOSITE PISTON OF POSITIVE DISPLACEMENT HYDRAULIC MACHINE AND METHOD FOR MANUFACTURING SAME

FIELD OF THE INVENTION

The present invention relates to the field of hydraulic engineering and more particularly to the construction of composite pistons of a positive-displacement hydraulic machine and to a method for manufacturing thereof.

The invention may be employed to the best advantage at engineering enterprises which manufacture either only composite pistons or positive-displacement hydraulic machines in general, such as axial-piston hydraulic pumps or motors.

The term "composite piston" is intended to denote a piston or plunger with a body in the form of a barrel having a blind coaxial hollow or bore open to one end of the barrel and accommodating a core of a material, such as aluminium, which is lighter than that of the barrel. The core is fixedly secured in the hollow or bore of the piston.

DESCRIPTION OF THE PRIOR ART

From hydraulic engineering practice it is known that composite pistons are employed in hydraulic machines to increase their volumetric efficiency. The problem of ensuring a fixed fastening of the core in the hollow or bore of the piston body is known as well. The problem stems from that in the course of operation, i.e. execution of a large number of reciprocations per unit time at a hydraulic fluid pressure of up to 32 MPa, the piston is subjected to high dynamic loads, with the result that the core, placed in the hollow of the piston, breaks down the means of its fastening to the piston body under the action of inertial forces.

Attempts to provide a stronger fastening has resulted, as a rule, in complicating either the construction of the composite piston or the process of its manufacture.

There has been proposed a composite piston of a positive-displacement hydraulic machine (GDR Pat. No. 73,453), comprising a piston proper in the form of a cylindrical body with a blind coaxial hollow wherein a core of a material lighter than that of the piston is installed with the aid of a thread. For a reliable securing of the core in the piston, apart from the threaded joint, additional fastening means are provided in the form of a pin which secures the piston and core to each other, and in the form of a spring-loaded arresting ring received in a groove made in the hollow of the piston.

The use of the above composite piston involves some difficulties. Firstly, a thread in the piston body is a source of stress concentration, which in itself impairs the dependability of the piston. Secondly, the existing clearances, in particular in the threaded joint and in general between the internal surface of the piston (i.e. the surface of the wall defining the hollow thereof) and the surface of the core tend to increase under dynamic loads. This eventually leads to failure of the piston; in other words, the piston is "broken" by the core which moves under the action of inertial forces.

In addition to the difficulties stemming from the construction of the piston, there are also difficulties associated with the process of manufacturing such a piston.

First, a separate manufacture of the piston proper and of the core essentially to the final dimensions in length is needed. An internal thread must be cut in the piston, and an external thread, on the core. Apart from this, a groove for a retaining spring ring must be made, a hole for a pin must be drilled, and finally an assembling must be carried out.

Thus, the above-described construction fails to meet the demands placed upon the dependability of a composite piston and entails a great labor expenditure.

There has also been proposed a composite piston (U.S. Pat. No. 3,633,467) wherein circular projections of any configuration, such as rings, thread, etc., are made in the blind hollow of the piston. A liquid filler is poured in such a hollow to form, after solidification, a core of the composite piston.

While involving relatively less labor for the manufacture, such a construction as well fails to provide the required reliability of core fastening in the hollow of the composite piston and calls for a complex production process, i.e. a process including a complex machining and mechanical working of the metals making up the piston.

There has further been proposed a composite piston and a method for manufacturing thereof (USSR Inventor's Certificate No. 412,813), according to which the piston body and the core are manufactured to an essentially final size with an internal collar provided at the piston end face where the open end of the hollow is located, the collar being in a concentric relation to the opening of the hollow. A core is placed into the hollow of the piston, following which the collar is subjected to a plastic deformation to constrict the open end of the hollow and thereby to hold the core in place.

Such a construction of the piston contemplates the presence of clearances between the surface of the core and the internal surface of the piston; hence, the movement of the core in the hollow of the piston is not restricted, which eventually results in fracturing the restricting collar, i.e. in a breakdown of the piston and a failure of the hydraulic machine. Besides, a collar at the piston end face increases the weight of the piston and leads to a unefficient utilization of the hydraulic machine working chamber volume.

The process of manufacturing such a piston features the shortcomings of all the prior art processes of manufacturing composite pistons, namely a separate manufacture of the piston and of the core essentially to their final dimensions with their subsequent assembling.

An object of the invention is to provide a composite piston of a positive-displacement hydraulic machine, which offers a simple construction and a higher dependability as compared with the state of the art.

Another object of the invention is to provide a composite piston of a positive-displacement hydraulic machine, which is less metal-intensive as against the state of the art.

Still another object of the invention is to provide a composite piston of a positive-displacement hydraulic machine, wherein the core without a clearance and with a preload contacts by its entire surface with the internal surface of the piston body.

SUMMARY OF THE INVENTION

The above-mentioned and other objects are attained by that in a composite piston of a positive-displacement hydraulic machine, comprising a piston proper in the form of a cylindrical body with a blind bore or hollow coaxial to the external surface of the body, in which hollow a core of a material lighter than the material of the piston is arranged and fixedly secured by constricting the open end of the hollow, according to the invention, the surface of the core is congruent with the internal surface of the piston skirt and is in a clearanceless preloaded contact therewith, the thickness of the piston wall beside the open end of the blind hollow being greater than the thickness of the wall at the middle part of the skirt of the piston.

The absence of clearances between the internal surface of the piston and the surface of the core excludes the possibility of an axial displacement of the latter. Besides, a constriction of the blind bore or hollow towards its open end provides an additional reliable fastening of the core within the piston body.

The above-mentioned and other objects are also attained by the provision of a method for manufacturing composite pistons of positive-displacement hydraulic machines, which includes placing a core into the hollow of a piston and securing the core in the hollow by constricting the latter towards its open end. According to the invention, a blank of the core is placed into a blank of the piston, having the configuration of a barrel, and the composite piston blank made in this manner is subjected to a direct straight-through cold extrusion through a die, the outside diameter of the piston blank being selected larger than the diameter of the finished piston by a factor of $1/\epsilon$, where $\epsilon$ is the permissible degree of deformation in the straight-through cold extrusion for the specific material, the diameter of the blind hollow of the piston being selected on the basis of a direct proportionality between the cross-sectional areas of the piston blank and finished piston, and the bottom part of the blind hollow of the piston being given the configuration of a truncated cone.

Such a method necessitates no precise machining of the piston blank and core blank. The piston blank and the core blank are assembled into the composite blank in a simple way, i.e. by directly placing one into the other. The piston resulting from the extrusion through the die requires only a finish machining. All this greatly simplifies the piston manufacturing process and at the same time enhances the dependability of the piston.

It is expedient that the composite piston blank be fed into the die by another, similar, composite piston blank. This will yield a continuous piston manufacturing process and obviate the need for employing an expendable mandrel with dimensions corresponding to those of the composite blank being worked.

BRIEF DESCRIPTION OF THE DRAWINGS

The invention will now be explained by a detailed description of the construction of the composite piston and of the method for manufacturing the same with reference to the accompanying drawings, in which:

The invention will now be explained by a detailed description of the construction of the composite piston and of the method for manufacturing the same.

FIG. 1 is a longitudinal sectional view of a composite piston of a positive-displacement hydraulic machine, constructed in accordance with the invention;

FIG. 2 is a diagrammatical view of a blank of the piston with a blank of the core introduced into a blind hollow interior of the piston;

FIG. 3 is a view of a die for extrusion therethrough of the composite piston blank; and FIG. 4 diagrammatically shows the process of a straight-through extrusion of the composite blank through the die.

DESCRIPTION OF THE PREFERRED EMBODIMENTS

A composite piston generally designated at 1 comprises a cylindrical piston proper 2 (FIG. 1). The piston has a blind bore or hollow 3 coaxial to the external surface and restricted at one end by the body of the piston 2. The hollow 3 converges towards its open end (i.e. the end opposite to that restricted by the body of the piston 2) so that the wall defined by the external working surface of the piston 2 and the internal surface thereof has the maximum thickness "a" beside the open end of the blind hollow.

The blind hollow 3 accommodates a core 4 made of a material which is lighter than the material of the piston 2. The suface of the core 4 is congruent with the internal surface of the piston 3 and is in a clearanceless preloaded contact with the latter surface.

As seen in FIG. 1, the piston 1 has at its end opposite to the open end of the blind hollow 3 a spherical portion 5 which, as also a through hole 6 extending over the entire length of the piston 1 coaxially to the external surface thereof, are not discussed as forming no part of the present invention and being only typical for a conventional piston of a positive-displacement hydraulic machine.

The above-described composite piston of positive-displacement hydraulic machine is manufactured as follows.

A piston blank 7 is produced by an inverted extrusion or machining in the form of a barrel with a blind bore or hollow 8.

The outside diameter of the piston blank 7 is selected larger by a factor of $1/\epsilon$ than the specified diameter of the finished piston, $\epsilon$ being the permissible degree of deformation in a direct cold extrusion for the given material. The diameter of the blind hollow 8 of the piston blank 7 is selected on the basis of a direct proportionality between the cross-sectional areas of the piston blank 7 and the finished piston 1. A bottom part 9 of the blind hollow 8 of the piston blank 7 is given the configuration of a truncated cone.

A core blank 10 is made as a cylinder whose diameter is essentially equal to the diameter of the blind hollow 8 of the piston blank 7 and whose length is somewhat, by an amount on the order of 2-3 millimeters, less than the depth of the blind hollow 8 of the piston blank 7. For the reasons well known to those skilled in the art, the core blank 10 is made of a material which is lighter than the material of the piston blank 7.

The core blank 10 is inserted into the blind hollow 8 of the piston blank 7, whereby a composite blank 11 of the piston is obtained.

The composite piston blank 11 is subjected to a direct straight-through cold extrusion through a die 12 (FIG. 3). The die 12 has an entry part in the form of two chambers made at angles $\alpha$ and $\beta$ respectively relative to the generatrix of the calibrating part of the hole of the die 12. The angle $\alpha$ is from 10° to 20°, and the angle $\beta$, from 30° to 50°.

As shown in FIG. 4, the composite blank 11 of the piston is subjected to a direct cold straight-through extrusion with the aid of a die set comprising the die 12 and a container 13 disposed in a coaxial relation with the die 12. The container 13 serves as a guide for the ram or, in the case under consideration, for a second composite blank 14 that forces the first composite blank 11 through the hole of the die 12 to form the composite piston 15.

At the initial moment of extruding the composite blank 11 of the piston, the profile of the piston body and the bottom of the hollow of the piston are formed. Next, a joint outflow of the piston material (steel) and of the core material (aluminium) takes place. At the final stage of the extrusion, at a butt-end height of about 2-5 mm, the open end of the blind hollow or bore of the piston blank is sharply constricted so that the wall defined by the external and internal surfaces of the piston being formed has the maximum thickness "a" (see FIG. 1) beside the open end of the blind hollow of the piston. Inasmuch as the composite blanks of pistons are fed into the die successively one after another, there proceeds a continuous deformation with a continuous output of finished, i.e. permanently joined with the core, pistons.

EXAMPLE

Composite pistons were fabricated. The piston blanks were of low-carbon (C≦0.25%) medium-alloy steels which could be subjected to chemicothermal or another type of surface hardening. The core blanks were of deformable aluminium alloys with an yield strength of $\sigma_y = 11$ to 22 kgf/mm$^2$. To increase the output and to save the metal, the barrel-shaped piston blank was produced by the method of indirect cold extrusion.

The principal dimensions of the blanks and of the composite piston obtained after the extrusion are given in the Table below.

The metallographic study of produced pistons has confirmed a clearanceless, tight joint of the core with the piston body. The mating surface is undulating over the entire boundary, which prevents the core from rotation relative to the piston body.

TABLE

| Dimensions of barrel-shaped piston blank | | | | Predetermined dimensions of finished pistons | | |
|---|---|---|---|---|---|---|
| outside diameter of barrel | barrel height | diameter of blind hollow of barrel and diameter of core blank | Degree of deformation of material ξ | outside diameter | length | core diameter |
| 32 | 34 | 20 | 0.5 | 22.6 | 90 | 14 |
| 48 | 75 | 30 | 0.54 | 32.6 | 150 | 20 |

Tests have shown that in pressing the core out of a disk cut from a middle part of the piston, shearing occurs in the core material rather than along the boundary between the two metals.

What is claimed is:

1. A method of manufacturing a composite metal piston for a positive-displacement hydraulic machine consisting of the steps of fabricating blanks of a piston with a hollow skirt having a blind bore defining a cavity in said skirt and a core of lesser length than said bore disposed in the hollow skirt bore each blank made as a cylinder blank and each of a different metal, said piston and core cylinder blanks respectively having before deformation thereof by cold extrusion an outside diameter greater by a factor of 1/ε than that of the finished piston and of the diameter of its finished core, where ε is the permissible degree of deformation by cold extrusion for the specific metal, the metal of said core blank having a lesser specific weight and possessing a lesser resistance to plastic deformation than the metal of said piston blank, the diameter of the axial bore being sized on a basis of a direct proportionality between the cross-sectional areas of the piston blank and the finished composite piston and the cross section and length of the core being sized on a basis of direct proportionality to the diameter and length of the axial bore and difference in metals of the piston blank and core blank and the composite piston cross-sectional areas, inserting said core cylinder blank axially into said axial bore to form a composite piston blank with the core fitting in said axial bore and having an end thereof spaced axially inwardly in said bore from an open end thereof, effecting plastic deformation of said composite piston blank radially inwardly and axially by cold extrusion in a die and while effecting said deformation of the composite piston blank while simultaneously cold flowing metal of said core axially and constricting radially inwardly the open end of said axial bore to effectively hold said core axially and radially permanently immobile in the skirt cavity of the extruded, composite piston with the core filling the entire piston skirt cavity.

2. A method according of manufacturing a composite metal piston for a positive displacement machine according to claim 1, including feeding said composite piston blank into said die by another similar composite piston blank.

3. A composite metallic piston for a positive displacement hydraulic machine consisting of, a piston head portion having an attached hollow skirt portion having an axial, blind bore defining an axial cavity extending axially away from the head portion with an open end in a trailing end of the skirt portion, the piston head portion and the skirt portion being made of a metal extrudable by cold extrusion, a prefabricated metallic core disposed inserted in said axial cavity completely filling it and made of a metal extrudable by cold extrusion and having a lesser specific weight and possessing a lesser resistance to plastic deformation by cold extrusion than the metal of said head portion and said skirt portion, means for retaining the prefabricated metallic core internally of said cavity axially and radially immobile in the skirt portion cavity with the core filling the entire axial cavity and free of any axial extension axially outwardly from said open end, said means comprising internal walls of the skirt portion defining the skirt portion cavity being in a permanent deformed state, constricted radially inwardly deforming the prefabricated core radially inwardly and maintaining it in a fixed state of radially inward deformation preventing axial and radial displacement of the core, the inner walls of said skirt defining said cavity as a space cylindrical in cross section along its length and adjacent said open end being constricted radially inwardly a greater extent than a remainder of inner walls defining the axial cavity, and the piston skirt portion having a uniform external transverse dimension.

4. A composite metallic piston according to claim 3, in which said metallic core is made of aluminum.

5. A composite metallic piston according to claim 3, in which the inner walls of said skirt portion are free of threads, grooves, recesses, depressions, furrows, channels, hollows, thereby to avoid concentrations of stresses thereon.

6. A composite metallic piston according to claim 3, in which said head portion and shirt portion are integral and made of steel, and which said core is made of aluminum.

* * * * *